United States Patent Office 3,402,199
Patented Sept. 17, 1968

3,402,199
METHOD FOR PRODUCING THREONINE
Tetsuhiro Kusunose, Nobeoka-shi, and Saburo Senoo and Masashi Nitta, Tokyo, Japan, assignors to Asahi Kasei Kogyo Kabushiki Kaisha, Osaka, Japan, a corporation of Japan
No Drawing. Filed July 13, 1964, Ser. No. 382,399
Claims priority, application Japan, July 13, 1963, 38/35,651
3 Claims. (Cl. 260—534)

This invention relates to a method for producing threonine. More particularly, this invention relates to a method for producing threonine by the reaction of an aqueous solution containing glycine, caustic alkali, and basic copper salt with acetaldehyde, followed by the elimination of copper from the resultant reaction product.

Threonine is an amino acid which is classified as essential in maintaining the growth of animals, and used as an intermediate for the synthesis of polyamino acid.

As for the synthesis of threonine, there has been known heretofore a method disclosed in the Japanese patent publication No. 1959–2964 and No. 1961–1968. Methods are also known by which threonine is produced without accompanying much of isomeric by-products.

However these methods require a step for preparing glycine copper salt either by previously heating glycine and basic copper carbonate or by reacting sodium salt of glycine with copper sulfate. Further for obtaining threonine, they require the operation of heating glycine copper salt with acetaldehyde in the presence of basic or strong alkaline catalyst in the form of aqueous solution or methyl alcohol solution and the maintaining of the reacting mixture at a temperature of from 40° C. to 80° C. for a definite period of time, e.g. more than one hour to complete the reaction. Accordingly these methods are not only relatively complicated but also are unsatisfactory in production yield.

An object of the present invention is, therefore, to provide a method which enables the production of threonine by a much simpler method with higher production yield.

The above and other objects can be attained by the present invention which enables the production of threonine simply by reacting an aqueous caustic alkali suspension of glycine and divalent copper salt with acetaldehyde in higher production yield and without requiring the step of preparing glycine copper salt in advance.

Since the reaction used in the present invention is a direct condensation of glycine with acetaldehyde to threo-type threonine and is different from the prior art processes in the point that the reaction does not pass the course which forms glycine copper salt en route. Even when a divalent copper salt and glycine are mixed with aqueous alkali solution, the reaction between the two does not proceed at ordinary temperature. Even when basic copper carbonate is used as a copper salt, most of the copper salt is in an insoluble state and does not react with glycine. When acetaldehyde is added to this suspension, the reaction proceeds immediately at room temperature and the formation of threonine is completed within a short time. Thus threonine can be produced with a production yield as high as from 93 to 98 percent.

The reason that threonine is formed with high production yield at ordinary temperature by the reaction with acetaldehyde is believed to be due to the fact that copper salt does not form a salt with glycine. This conclusion is obtained from the tracing of the reaction by polarography.

Namely the half wave potential of glycine copper salt in 2 normal aqueous potassium hydroxide solution (A) is $-0.162$ volt, and the half wave potential of basic copper carbonate plus 2 normal potassium hydroxide system (B) and the half wave potential of basic copper carbonate plus 2 normal potassium hydroxide plus glycine system (C) are both $-0.154$ volt. Accordingly the half wave potential B or C is clearly different from A and the values of B and C do not vary according to the lapse of time. Moreover also in the practice of the present invention, it is observed in reality that the basic copper salt remains in the completely insoluble state. From this fact also it is possible to consider that the reaction of the present invention does not pass the course in which glycine copper salt is formed as an intermediate product.

As for the role of divalent copper in the threonine forming reaction, it is relevant to consider the following. The divalent copper in the present invention does not act as in the prior art process in which the hydrogen atom in the α-position turns to the labile state of readily jumping off by forming glycine copper salt by which the proceeding of condensation of acetaldehyde with methylene radical becomes easier, but since glycine and copper do not form a salt, copper reacts at first with a compound other than glycine for example with acetaldehyde in a certain way and performs a role of constituent of complex salt in the case when threonine-copper complex salt is formed from acetaldehyde and glycine.

As for the reaction conditions of the present invention, the reaction can be carried out at a temperature from 0° C. to 98° C. However, from the viewpoint of convenience of the reaction, ordinary room temperature is preferred. The reaction is completed within the short time of 30 minutes. Threonine can be liberated by eliminating copper from threonine copper thus obtained. Copper can be eliminated by known procedures, i.e. the copper is eliminated in the form of copper sulfide as described in Example 1 (cf. Okawa et al.; U.S. Patent 2,999,878 or Japanese Patent No. 1959–2694); the copper is eliminated by making the reaction solution ammoniacal and allowing a cationic resin ($NH_3$ form) to adsorb the same (cf. Fedoseeva et al.; Chemical Abstracts, vol. 58 (1963), p. 6923), or by a combination of the above procedures.

When glycine copper is used instead of glycine and basic copper carbonate and the same condensation reaction was carried out at the same conditions as in the examples the yield of threonine was from 30 to 35 percent.

The superiority of the present invention is understandable by the comparison of the above-mentioned yields.

In order that those skilled in the art may more fully understand the nature of my invention and the method of carrying it out, the following examples are given.

EXAMPLE 1

75 g. of glycine and 72 g. of basic copper carbonate were placed in a reaction vessel and then 550 ml. of 2 normal potassium hydroxide was added. While stirring at room temperature, 150 ml. of acetaldehyde was dropped therein within 5 minutes. During the reaction time, basic copper carbonate mostly remained in or insoluble state. While continuing stirring for 20 minutes after finishing dropping of acetaldehyde, 230 ml. of 6 normal hydrochloric acid was added, then carbon dioxide gas evolve.

Sufficient amount of hydrogen sulfide was passed through this solution and copper ion was precipitated as copper sulfide and filtered. It was observed by analytical result that threonine was formed in this solution in an amount of 96.6 percent.

1.6 l. of the filtrate was concentrated to 800 ml. under vacuum, and passed through 600 ml. of H⁺ type ion exchange resin "Dowex 50W-X8" (trade name, product of Dow Chemical Company) to adsorb threonine. After washing with water, threonine was dissolved out by 2 normal aqueous ammonia. The dissolved liquid was concentrated under vacuum, added to alcohol and allowed to stand in a cold place whereby crude crystal of threonine precipitate.

By filtering the crude crystal, followed by washing with alcohol, 103 g. of threonine crude crystal was obtained. When the filtrate was further concentrated and added with alcohol, 7.5 g. of crude threonine crystal was obtained. These two kinds of crude crystal were combined and dissolved in about 3 times an amount of water by heating, treated with active charcoal for decoloration, and separated from active charcoal by filtration. When about 4 volumes of methyl alcohol were added to the resulting filtrate, pure crystal of threonine was produced. By filtering the crystal, followed by washing with methyl alcohol, 103 g. of pure threonine crystal was obtained. Total yield was 86 percent relative to theoretical.

The proportion of threonine to allothreonine was 41 to 9.

The analytical result of the resultant threonine was as follows: Analytical value—C, 40.36; H, 7.64; N, 11.50. Theoretical value—C, 40.33; H, 7.62; N, 11,76.

EXAMPLE 2

Example 1 was repeated in the same reaction conditions except that 390 ml. sodium hydroxide was employed in place of the 550 ml. of potassium hydroxide. Threonine in the filtrate from which copper had been removed, showed a yield of 95.7%.

The filtrate was concentrated under reduced pressure in a half volume, i.e. 500 ml. from 1 litre, and then treated as in Example 1 to yield 6.5 g. of impure crystalline threonine.

What is claimed is:
1. A method for producing threonine comprising reacting acetaldehyde with a suspension of a mixture of glycine and a basic copper salt in an aqueous caustic alkali solution at a temperature up to about 100° C. for about 30 minutes, adding hydrochloric acid to stop the reaction and then removing copper from the resulting reaction product solution, said caustic alkali, acetaldehyde, basic copper salt and glycine being present in a molar ratio of 0.8–1.2:2–3:1–1.5:1.

2. A method according to claim 1 wherein the temperature is room temperature.

3. A method according to claim 1 wherein the basic copper salt is copper carbonate.

References Cited

UNITED STATES PATENTS 2,999,878  9/1961  Okawa et al. _____ 260—534 XR

OTHER REFERENCES

Bolhofer: J. Am. Chem. Soc., vol. 76 (1954), pp. 1322–6.

Fedoseeva: Chemical Abstract, vol. 58 (April 1963), col. 6923(a).

Turyan et al.: Chemical Abstract, vol. 58 (March 1963), col. 5473(a).

LORRAINE A. WEINBERGER, *Primary Examiner.*

A. P. HALLUIN, *Assistant Examiner.*